A. S. HUBBARD.
ELECTRICAL SYSTEM OF DISTRIBUTION.
APPLICATION FILED FEB. 10, 1909.

1,134,337.

Patented Apr. 6, 1915.
3 SHEETS—SHEET 1.

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,134,337.  Specification of Letters Patent.  Patented Apr. 6, 1915.

Application filed February 10, 1909. Serial No. 477,222.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to improvements in electrical systems of distribution and especially to systems in which a compensatory battery is connected at a station or substation and regulated by a booster to steady the load upon the main dynamo.

The object of my invention is to automatically limit the current that is permitted to fall upon the battery and booster and to automatically vary the station potential when the battery current is limited, so that the actual load on the booster may be still further reduced and that on the main generator or sub-station converting apparatus may also be limited when desirable. I achieve this object by a means automatically controlled by battery current or booster voltage or both and acting to reduce or oppose the usual automatic regulation of the booster, and by means similarly controlled and acting to vary the field-strength of the main dynamo or motor generator or rotary converter of the station or sub-station and so the line potential.

By my invention I am enabled to provide batteries, boosters, and regulating apparatus of relatively small size and so comparatively cheap, while moreover the source of current at the station or sub-station may supply a substantially constant load, notwithstanding the increased current such source is called upon to supply when the discharge of the battery has become limited. The source, therefore, need not be enlarged by reason of the limiting of battery load, and, where the invention is embodied in a sub-station, the electric energy supplied thereto may be maintained substantially uniform.

My invention also includes the same limitation, if desired, of battery current and booster load when the battery is charging at a high rate, the potential of the station in this instance being increased at such time.

Further objects, advantages and features will more clearly appear from the detailed description given below, taken in connection with the accompanying drawings, which form a part of this specification.

Figure 1:
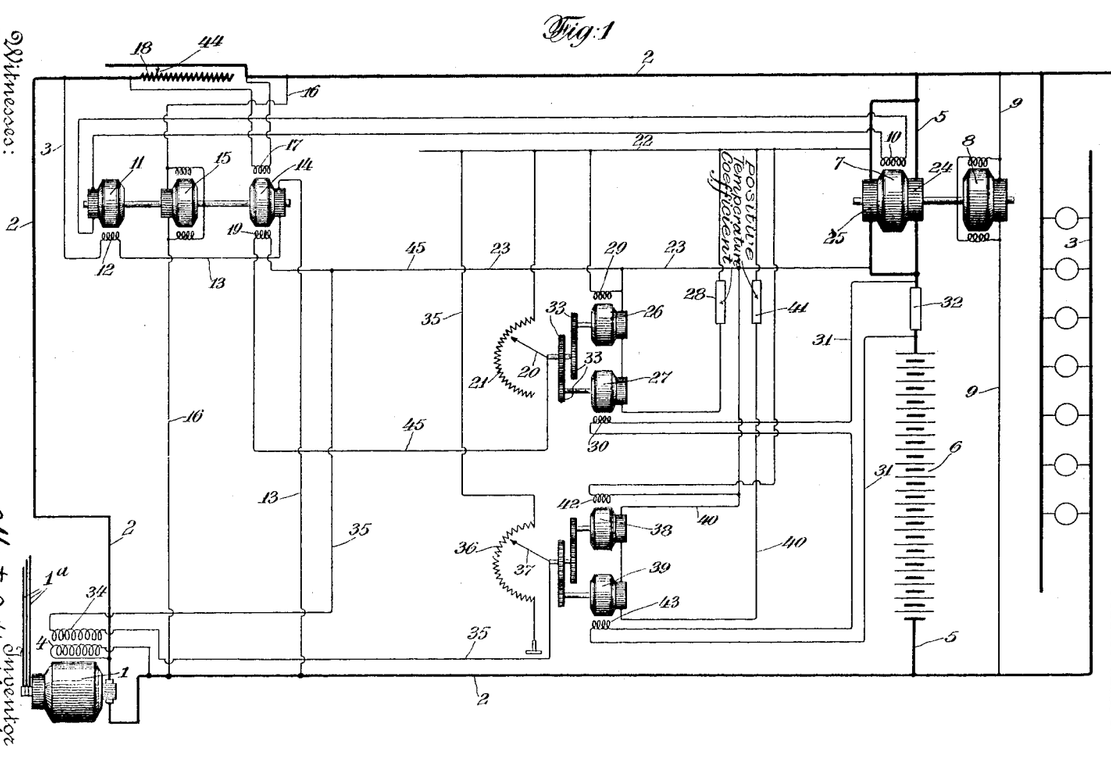
Figure 1 shows diagrammatically a system embodying one form of my invention.

Referring to Fig. 1, 1 represents a main generator supplying the feed circuit 2, 2 which is connected with its load 3, which may consist of lamps or other translating devices. The main generator 1 may be in the form of a converter supplied by the alternating current circuit $1^a$ or in the form of motor generator apparatus, or may be a dynamo driven from any usual source of power. As shown it is provided with shunt fields 4. Connected across the feed circuit 2, 2, is a battery circuit 5, 5 with the battery 6 in series therein, and in series with the battery is a booster 7 driven by a shunt motor 8 connected across the circuit 2, 2 by conductors 9. The booster 7 is excited by field coil 10 connected in series with the armature of an exciter 11. The exciter 11 is provided with a field coil 12 connected in a circuit 13, 13 across the main circuit 2, 2 and having in series therewith the armature of a counter machine 14. Both the exciter 11 and counter machine 14 are driven by a shunt motor 15 connected across the main circuit 2, 2 by conductors 16. The counter machine 14 is primarily excited by field coil 17 connected in shunt to a resistance 18 in series in the main circuit 2, 2. The resistance 18 may be varied by means of a movable contact 44.

When the load on the system is normal and the battery is floating across the line the field strength of coil 17 is just sufficient to cause the counter machine 14 to produce an electro-motive-force exactly equal, but in the opposite direction to the electro-motive-force applied to the circuit 13, 13 from the main feed circuit 2, 2. If the load on the system increases the strength of windings 17 increases, thereby increasing the potential produced by the contour machine 14 so that a current is produced in the circuit 13 and the field coil 12 of exciter 11 is energized in such a direction as to cause the exciter 11 to energize the field coil 10 of the booster 7 to cause the booster to produce a voltage in a direction to cause the battery to discharge and take substantially the additional load placed upon the system. If the load on the system drops below normal the coil 17 is weakened and the voltage of the line overcomes the opposing voltage of the counter machine 14, whereby the exciter 11 produces a current in the opposite direction to oppositely excite the booster 7 so that it produces a voltage in a direction to cause the battery to be charged from the main feed circuit 2, 2 and thereby tend to maintain the load on the generator 1 constant. In such systems it is often found desirable to limit the load which may thus be placed upon the battery both when the battery is charging and discharging. In order to accomplish this I provide the counter machine 14 with a field coil 19 in series in a circuit 45 and so that it is connected to be responsive to fluctuations of current in the battery circuit and to fluctuations of booster voltage. The coil 19 is connected at one end to the movable member 20 of the variable resistance arrangement 21, one end of the variable resistance 21 being connected to a conductor 22 of an auxiliary supply circuit. The other terminal of the field coil 19 is connected to the other conductor 23 of said supply circuit. By moving the arm 20 the resistance 21 is varied thereby varying the current in field coil 19. When the arm 20 is moved to its lowermost position so that all of the resistance 21 is placed in circuit, the resistance 21 is so large that the current in field coil 19 will be inappreciable.

The booster 7 is provided with two commutators 24 and 25 connected in parallel in the battery circuit. The auxiliary feed circuit 22, 23 is connected to be supplied from the voltage developed across the booster 7, as shown.

26 and 27 are two motors or dynamometers having their armatures connected in series across the circuit 22, 23 with a high temperature coefficient resistance 28 in series therewith to limit the current therethrough. The field 29 of motor 26 is also connected across the circuit 22, 23 and is therefor responsive to variations in the booster voltage. The field 30 of the motor 27 is connected in series in a circuit 31 which is connected across a shunt 32 in series with the battery circuit, so that the coil 30 is responsive to changes of current through the booster and battery. The motors or dynamometers 26 and 27 are provided with mechanical apparatus so that they will not operate until the field coils 29 or 30 have reached a predetermined excitation, and this predetermined excitation may be different in the case of each motor. The apparatus is further arranged so that each motor will operate upon the movable member 20 independently of the other motor or dynamometer. This operation takes place through gears which are diagrammatically shown in Fig. 1 by reference character 33. The particular operation of this apparatus and a detailed description thereof is hereafter given and the detailed apparatus shown in other figures.

The operation of coil 19 is to limit the load which may be imposed upon the battery and its circuit. When the load on the battery or its circuit reaches a predetermined value, which value may be indicated by a certain value of current in the field coil 30 corresponding to current in the battery circuit, or a predetermined current in the field coil 29 corresponding to a predetermined value of booster voltage, either one or the other of the dynamometers 26 or 27 operate to cause the movable arm 20 to decrease the variable resistance 21 and thereby increase the excitation of field coil 19 in such a direction as to oppose the action of field coil 17 of the counter machine and thereby counteract its regulating functions so that the generator 1 is caused to take further increases of load and the load on the battery and its circuit is limited.

It will be apparent, that with increases of load on the battery circuit the voltage across the booster increases correspondingly and it is often desirable to limit the voltage which will be applied to the booster, especially if the design of the booster is such that it will take only a definite load and will not warrant the passage of large currents therethrough at such high voltages. In order to bring about these advantages and limit the load which will be applied to the booster, I provide means for cutting down the voltage of the feed circuit 2, 2 thereby decreasing the difference in voltage between the battery and the feed or consumption circuit 2, 2 so that the voltage across the booster 7 is thereby decreased. I effect this action responsively to variations from a predetermined value of battery current and from a predetermined value of booster voltage, by varying the field strength of the main generator, thereby varying its voltage which is applied to the consumption of feed circuit 2, 2.

The voltage of the main generator 1 is varied by the application thereto of an auxiliary field 34 connected in series in a circuit 35 across the auxiliary supply conductors 22, 23. The field 34 has in series therewith a variable resistance 36 operated by a movable arm 37, which in turn is controlled by dynamometers 38 and 39 in the same manner as dynamometers 26 and 27. The dynamometers 38 and 39 have their armatures connected in series in a circuit 40 connected across the auxiliary supply mains 22, 23 with a high temperature co-efficient resistance 41 in series therewith in order to limit the current therethrough. The dynamometer 38 is made responsive in its action to variations in the voltage of the booster by having its field coil 42 connected across the auxiliary supply circuit 22, 23, which is fed by the booster voltage. The dynamometer or motor 39 is made responsive in its action to the booster current or current in the battery circuit by having its field coil 43 connected in series in the circuit 31 which is connected across the shunt 32 in the battery circuit. The dynamometers or motors 38 and 39 are also provided with means for rendering them inoperative until the currents in the coils 42 and 43 shall have reached a predetermined value so that the voltage of the feed circuit 2, 2, is not decreased until the load on the booster has reached a predetermined value.

The dynamometers 38 and 39 are brought into action to decrease the line of voltage, so that so much energy will not be lost in the booster and in the booster motor when the booster is carrying heavy loads. The time when the dynamometers 38 and 39 are brought into operation is purely a matter of design and the dynamometers 38 and 39 may be brought into operation at any desired point in the operation of the system according to the particular requirements of the system to which my invention is applied.

Figure 2:
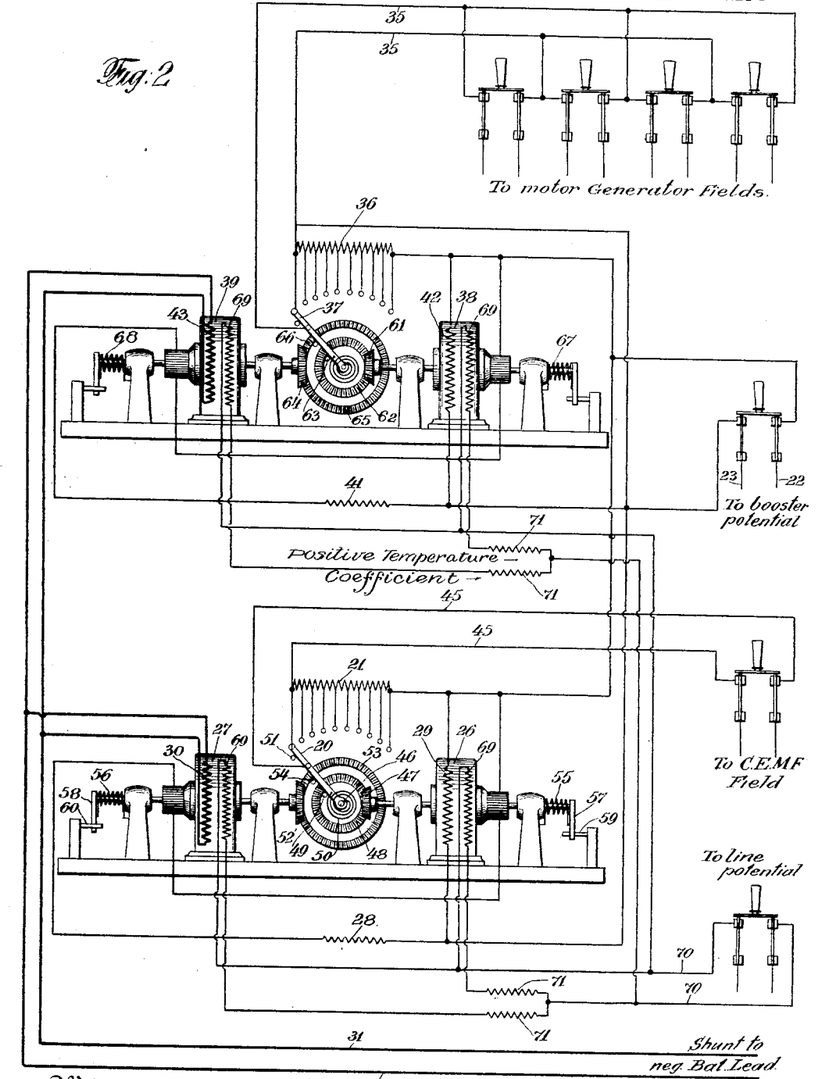
Fig. 2 represents diagrammatically and in detail portions of the regulating apparatus and circuits used in the system shown in Fig. 1 with some additional features.

Referring to Fig. 2, I there show regulating apparatus for controlling the coils 19 and 34 as above described. The various dynamometers 26, 27, 38 and 39 are connected as shown in Fig. 1. The movable arm 20 is connected to rotate about the point 46. The dynamometer 26 drives a pinion 47 which meshes with a pinion 48 carrying a pin 49 which when the motor 26 rotates causes the pin 49 to rotate so that it moves the arm 20 over the various contact points of the resistance 21. A spring 50 acts to tend to return the arm 20 back to its original position against a stop 51. The motor 27 is connected to drive a pinion 52 which meshes with a pinion 53 which carries a stop 54 adapted to engage the arm 20 when the pinion 53 rotates and move the arm over the various contact points of the resistance 21. It will thus be seen that each motor or both together must generate a torque sufficient to overcome the opposing action of the spring 50 before the arm 20 will be rotated, and it will be further apparent that each motor or dynamometer may act independently of the other and that one motor may have developed a torque sufficient to move the arm 20 without the other one having done so, so that the arm 20 moves responsively to the motor generating the greatest torque. The action of the motors may be further varied by means of springs 55 and 56 upon the shafts of the motors 26 and 27, respectively. These springs are connected at one end to the frame of the machine and at the other end to members 57 and 58, which are secured to the shafts of the respective machines. The tension of these springs 55 and 56 may be independently adjusted so that the torques which the motors must produce before overcoming the opposing actions of these springs may be quite different. When the dynamometers are at rest the members 57 and 58 contact with the stops 59 and 60 being forced thereagainst by the springs 55 and 56. It will thus be apparent that each motor or both motors will have to produce a torque sufficient to overcome the opposing action of its spring 55 or 56 and the spring 50 before any turning movement will be imparted to the arm 20. By adjusting the tension of these springs each motor may be made to produce a different torque before it will cause any movement of the arm 20.

The motors 38 and 39 are provided with similar appurtenant apparatus to that shown in connection with motors 26 and 27. Thus the motor 38 drives gear 61 meshing with gear 62, which carries a pin 63 for moving the arm 37. Motor 39 carries a gear 64 meshing with gear 65 which carries a pin 66 for moving the arm 37 over the contacts of the variable resistance 36. These motors are also provided with adjusting springs 67 and 68. Since the various field coils 29, 30, 42, 43 of the various motors are connected across the terminals of the booster or in shunt to the battery circuit, the current in these coils will vary in direction in accordance with the direction of the current in the battery circuit. In order that the value of the field excitation of these motors may be regulated differently when the current in the battery circuit is in one direction from the regulation when the current of the battery circuit is in the other direction, I provide field coils 69 on each of the motors 26, 27, 38 and 39, which field coils are connected to a circuit 70, 70, which is connected to any convenient source of electro-motive-force, such as the circuit 2, 2. High temperature co-efficient resistances 71 may be placed in series with each of these field coils 69 in order to maintain the current therein substantially constant.

From the above it will be apparent that the various dynamometers shown in Fig. 2 are rendered inoperative until the currents in their respective field coils 29, 30, 42 and 43 have reached a predetermined value, if no auxiliary excitation is provided. Therefore the presence of field coil 69 causes the value of excitation due to field coils 29, 30, 42 and 43 to be increased when the battery current is in one direction and to be decreased when the battery current is in the other direction. It will, therefore, be clear that the dynamometers act upon variations from a predetermined electrical condition of the booster when the battery current is in one direction, and act upon the variations from a different and independent predetermined electrical condition of the booster when the battery current is in the opposite direction.

Figure 3:
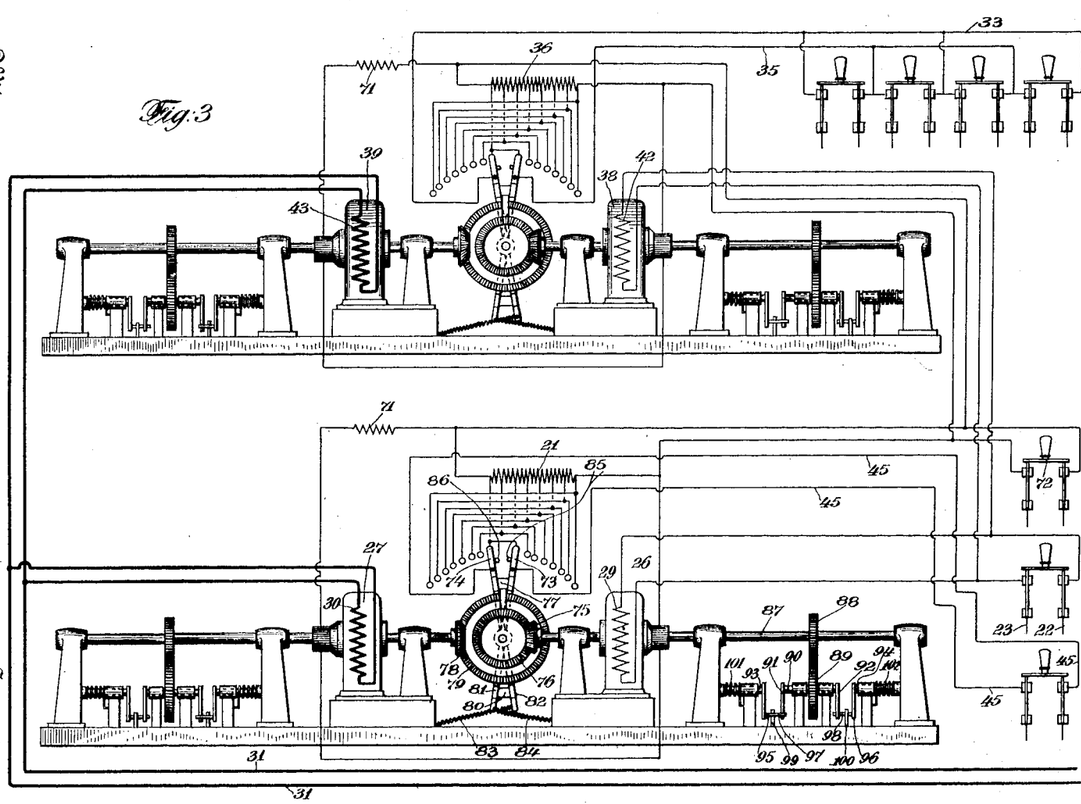
Fig. 3 is a view similar to Fig. 2 but showing a modified form of regulating apparatus.

Referring to Fig. 3, I show the dynamometer regulating apparatus similar to that shown in Fig. 2, but with the elimination of the field coil 69 and with the substitution of mechanical apparatus for effecting substantially the same result. The variable resistance 21 is connected in series in circuits 45, 45 which is connected to the field 19 of the counter-electro-motive-force machine 14. The variable resistance 36 is connected in series in the circuit 35, 35 which leads to the auxiliary field winding 34 on the main generator 1. In both Figs. 2 and 3 I have shown this circuit 35 connected to several knife switches so that various parts of the field 34 or other auxiliary fields may be thrown in circuit upon the generator. The field coils 30 and 43 on the motors 27 and 39, respectively, are connected across the shunt 32 31, which is connected across the battery circuit. The field coils 29 and 42 of the motors 26 and 38, respectively, are connected to the auxiliary field circuit conductors 22 and 23 which are in turn connected across the booster potential. In this figure, therefore, instead of connecting the various armatures across the booster potential I have shown an arrangement whereby they may be connected across some other source of electro-motive-force by means of knife switch 72. This source of potential may be, if desired, the circuit 2, 2.

The variable resistance 21 is controlled by means of two contact arms 73 and 74. The shaft of motor 26 is connected to drive a pinion 75 which meshes with a pinion 76, which pinion carries a projection 77 adapted to engage and move either of the arms 73 or 74 in accordance with the direction in which the pinion 76 rotates. The motor 27 is connected to drive a pinion 78 meshing with gear 79 which has secured thereto a projection 80 adapted to engage with either of the extensions 81 or 82 of the arms 73 and 74, respectively, to rotate either one or the other of them in accordance with the direction of rotation of the pinion 79. Thus when the field strength of coil 29 has reached a predetermined value in one direction the arm 73 is moved over the various contacts of resistance 21 and when the motor 26 has reached a predetermined excitation in the other direction the arm 74 is moved over the various contacts of resistance 21. In a similar manner the motor 30 operates either one or the other of the arms 73 or 74 in accordance with the direction of its field excitation. The arms 73 and 74 are acted upon by springs 83 and 84, respectively, to bring them back to their normal positions against stops 85 and 86 when the motors 26 and 27 are rendered inoperative. The motor 26 is provided with shaft 87 carrying gear 88 which meshes with the gear 89, which in turn is connected to a shaft 90. The shaft 90 is provided with arms 91 and 92 at either of its ends.

93 and 94 are shafts carrying arms 95 and 96, respectively, with extensions 97 and 98, which extensions are held against stops 99 and 100 by means of coil springs 101 and 102 secured to the frame at one end and to the shafts 93 and 94, respectively, at their other end. By adjusting the tension of the springs 101 and 102 to different values the torque necessary to cause the shaft 87 to turn in one direction may be made different and independent from the torque necessary to cause the shaft 87 to turn in the other direction. That is, when turning in one direction a torque must be applied to the shaft 87 sufficient to overcome the initial tension of spring 101 before the shaft will begin to turn, and when the torque is applied in the other direction it must be sufficient to overcome the tension of spring 102 before the shaft will begin to turn. In this manner the predetermined value at which the motor 26 operates responsively to voltage variations of the booster is varied in accordance with the direction of the current therethrough. In a similar manner the action of dynamometer 27 may be varied so that the predetermined value at which it will operate will be different when the battery current is in one direction from the predetermined value at which it will operate when the battery current is in the other direction. Since the parts for causing this operation are exactly similar to those for causing the similar operation of the motor 26, a detailed description thereof need not be given.

The motors or dynamometers 38 and 39 are controlled mechanically to adjust the predetermined values of booster voltage and current on departures from which they operate in exactly the same manner as the motors 26 and 27 and therefore a detailed description thereof is not necessary.

Although in Fig. 2 I have shown an arrangement whereby the pair of dynamometers which operate upon the regulating field coil 19 is the same as the pair of dynamometers which operate upon the regulating field coil 34, and in Fig 3 I have shown the pair of dynamometers which operate upon the field coil 34 the same as the pair of dynamometers which operate upon the field coil 19, nevertheless, it will be apparent that the arrangement of dynamometers shown in Fig. 2 might be used to control the field coil 19, while a pair of dynamometers such as is shown in Fig. 3 could be used to control the field coil 34, or vice versa, or any one of the motors or dynamometers 26, 27, 38 or 39 and its appurtenant mechanical and electrical mechanism might be substituted for any one of the others, and I desire it to be understood that I fully comprehend such changes and improvements in my invention.

Referring to Fig. 1, the general operation of the system is as follows. When the load on the system is at the predetermined average value the counter-machine furnishes no current and the booster is not excited. The booster, therefore, produces no voltage and the battery will float across the line. When the load on the system increases the booster is excited in a direction to cause the battery to discharge and take the increase in load. This action occurs up to a certain point when the booster voltage or the battery current becomes sufficient to excite dynamometer 26 or 27, so that variable resistance 21 is operated, thereby preventing a further increase in the excitation of the counter-machine or causing a decrease in the excitation of the counter-machine and preventing a further increase in the booster voltage or causing a slight decrease in booster voltage so that the generator will take all further increases in load on the system. In a similar manner, if the load on the system decreases below the average value the battery will receive a charging current up to a certain value, which value is determined by dynamometer 27. If the current through the battery tends to become greater than this value the dynamometer 27 so affects the booster voltage that the battery current is decreased or prevented from increasing. In a like manner the battery charging current may be determined by the dynamometer 26, in accordance with the booster voltage. It is to be noted that the field 19 being connected across the booster has a direction of current depending upon the direction of current through the booster. When, therefore, the booster is discharging the current in field 19 is in one direction and when it is charging is in the opposite direction. The current in field 19, therefore, always tends to cut down the electromotive force applied to the coil 12 of the exciter 11 and therefore the current in the booster field 10. Therefore, an increase of current in coil 19 either on charge or discharge, tends to reduce the booster voltage and so the current in the battery circuit.

When the load on the system increases above its average value and when this increase in load becomes very heavy the load upon the motor 8 and the energy absorbed by the booster 7 becomes quite large. To decrease the energy thus lost the voltage of the main generator is decreased, thus decreasing the line voltage so that the voltage of the booster circuit has to be raised only very slightly, if at all, in order to discharge the proper energy onto the line. This action is affected by means of the dynamometers 38 and 39 responsive to the booster voltage and battery current respectively, so that when these factors become fairly large the line voltage is decreased, thereby decreasing the loss of energy in the booster motor 8 and booster 7. In actual practice it is found that this can be done without materially altering the load on the main generator 1 and it is immaterial which of the sets of dynamometers 26 and 27 or 38 and 39 operate first. In a like manner when the battery is charging, if the energy absorbed by the motor 8 and booster 7 should become excessive, the voltage of the main generator may be increased to cut down this loss without materially affecting the output of the main generator. The field winding 34 of the source 1 being connected across the booster has a current whose direction depends upon the direction of current through the booster and it is for this reason that, as above described, the line voltage is decreased when the dynamometers 38 and 39 are operated on the discharge of the battery to reduce resistance 36 and is increased when the same dynamometes act to decrease this resistance and the battery is charging.

From the above it will be clear that I have provided an exceptionally efficient and effective means for regulating and adjusting the potential of the main generator 1 and regulating the potential applied to the booster 7 so that the electrical condition thereof is limited so that damage will not be done thereto and excessive loads placed thereupon. It will also be apparent that by providing the auxiliary supply circuit 22, 23 connected across the booster terminals I eliminate a wasteful use of energy since when it is not desired to utilize the dynamometers for regulating purposes the energy of the circuits 22, 23, which supplies the dynamometers is much decreased, and if the battery is floating this energy may be *nil*.

Althrough I have described my improvements in great detail and with reference to a specific system, it is evident that my broad invention is applicable to many other kinds of systems and arrangements, but Having described my improvements fully and clearly, what I claim and desire to secure by Letters Patent is:

1. The combination of a source of electricity, a storage battery in parallel therewith, a booster regulated to compel the battery to discharge to compensate for increases of load, and means, maintained inoperative during the discharge of the battery until a given battery current is reached, for reducing the potential of said source.

2. The combination of a source of electricity, a storage battery in parallel therewith, a booster regulated to compel the battery to discharge to compensate for increases of load, and means, maintained inoperative during the discharge of the battery until a given booster potential is reached, for reducing the potential of said source.

3. The combination of a source of electricity, a storage battery in parallel therewith, a booster regulated to compel the battery to discharge to compensate for increases of load, and means, maintained inoperative during the charge of the battery until a given battery current is reached, for increasing the potential of said source.

4. The combination of a source of electricity, a storage battery in parallel therewith, a booster regulated to compel the battery to discharge to compensate for increases of load, and means, maintained inoperative during the charge of the battery until a given booster potential is reached for increasing the potential of said source.

5. The combination of dynamo apparatus receiving alternating current and supplying direct current, a storage battery in parallel with the direct current supply mains thereof, means for limiting the battery load, and means operating independently of said limiting means for decreasing the direct current potential from said dynamo apparatus.

6. The combination of dynamo apparatus receiving alternating current and supplying direct current, a storage battery in parallel with the direct current supply mains thereof, a booster in series with the battery and regulated to compel the discharge of the battery, means for limiting the booster potential, and means operating independently of said limiting means for decreasing the direct current potential from said dynamo apparatus.

7. The combination of a dynamo source of electricity, a compensatory storage battery, a booster for controlling the charge and discharge of the battery, means for limiting the battery current, motor apparatus governing a resistance in a field winding of said source, said motor apparatus being connected to be operated through a current varying with that of said battery, and means opposing the operation of said motor apparatus.

8. The combination of a dynamo source of electricity, a compensatory storage battery, a booster for controlling the charge and discharge of the battery, means for limiting the booster potential, motor apparatus governing a resistance in a field winding of said source, said motor apparatus being connected to be operated through a current varying with the potential of said booster, and means opposing the operation of said motor apparatus.

9. The combination of a dynamo source of electricity, a compensatory storage battery, a booster for controlling the charge and discharge of the battery, means for limiting the booster potential, motor apparatus governing a resistance in a field winding of said source, said motor apparatus being connected to be operated through a current varying with that of said battery and also through a current varying with the booster potential, and means opposing the operation of said motor apparatus.

10. In an electrical system of distribution, a generating source of electric current, a battery and its circuit connected thereto, a booster in series with the battery, and means for regulating the voltage of said source responsive both to voltagle variations of the booster and current fluctuations of the booster circuit.

11. In an electrical system of distribution, a source of current, a circuit and its load connected thereto, a storage battery and its circuit and booster in operative relation thereto, means including the booster for controlling the division of load between the generator and battery, a device provided with a coil responsive to changes in the electrical condition of the booster, means acted upon by said device for controlling the voltage across the source, and means for rendering said device inactive until the current in said coil has reached a predetermined value.

12. In an electrical system of distribution, a source of current, a circuit and its load connected thereto, a storage battery and its circuit and booster in operative relation thereto, means including the booster for controlling the division of load between the generator and battery, apparatus provided with windings responsive to current and voltage changes in the booster, means acted upon by said apparatus for controlling the voltage of said source and thereby the load on the booster, and means for rendering said apparatus inoperative until the current in said windings has reached a predetermined value.

13. In an electrical system of distribution, a main source of electrical energy, a feed circuit and its load supplied thereby, a storage battery and its circuit in operative relation thereto, a booster for controlling the battery action, means responsive to load changes on the system for regulating the booster, means for counteracting said regulating means responsive to changes in the electrical condition of the battery circuit, and independent means for varying the voltage of the feeding circuit to limit the load on the booster responsive to variations in the electrical condition thereof.

14. In an electrical system of distribution, a source of electric energy, a feed circuit and its load supplied thereby, a storage battery and its circuit in operative relation thereto, a booster for controlling the action of the battery, a device for varying the voltage of the feeding circuit, a coil for controlling the action of said device responsive to fluctuations of current in the battery circuit, and means for rendering said device inoperative until the current in said coil has reached a predetermined value.

15. In an electrical system of distribution, a source of electric energy, a feed circuit and its load supplied thereby, a storage battery and its circuit in operative relation thereto, a booster for controlling the action of the battery, a device for varying the voltage produced by said source to limit the load on the booster, a coil for controlling the action of said device responsive to voltage fluctuations of the booster and means for rendering said device inoperative until the potential across the terminals of the booster has reached a predetermined value.

16. In an electrical system of distribution, a generating source of electric energy, a feed circuit and its load supplied thereby, a storage battery and its circuit in operative relation thereto, a booster for controlling the action of the battery, a device for varying the voltage produced by said source to limit the load on the booster, a coil for controlling the action of said device responsive to changes in the electrical condition of the battery circuit, and means for rendering said coil operative when the battery circuit has reached a predetermined condition when the battery is discharging, and for rendering said coil operative when the battery circuit has reached a different condition when the battery is charging.

17. In an electrical system of distribution, a generating source of electric energy, a feed circuit and its load supplied thereby, a storage battery and its circuit in operative relation thereto, a booster for controlling the action of the battery, apparatus for varying the voltage produced by said source to limit the load on the booster, means for controlling said apparatus responsive both to fluctuations of booster current and booster voltage, and means for controlling said apparatus to cause it to operate only when the booster current has reached a predetermined value or only when the booster voltage has reached a predetermined value.

18. In an electrical system of distribution, a source of electric current, a feed circuit and its load supplied thereby, a battery and its circuit in operative relation thereto, a booster for controlling the battery action, and means for varying the potential of said source to control the load on the booster responsive to departures from a predetermined electrical condition of the booster, said means including a motor arrangement connected to have a substantially constant armature current when it is operative and substantially no armature current when the battery is floating.

19. In an electrical system of distribution, a source of electric current, a feed circuit and its load supplied thereby, a battery and its circuit in operative relation thereto, a booster for controlling the battery action, and means for varying the potential of said source to control the load on the booster responsive to departures from a predetermined electrical condition of the booster, said means including a motor device connected to receive no energy when the battery is floating, but arranged to become active as the booster becomes active.

20. In an electrical system of distribution, a source of electric energy, a feed circuit and its load supplied thereby, a storage battery and a booster connected in a circuit across the feed circuit, and means for controlling the division of load on the system responsive to fluctuations thereof, said means including a motor device having its armature and field current responsive to changes in the electrical condition of the booster.

21. In an electrical system of distribution, a source of electric current, a feed circuit and its load supplied thereby, a battery and its circuit in operative relation thereto, a booster for controlling the battery action, and means for varying the potential of said source to control the load on the booster responsive to departures from a predetermined electrical condition of the booster, said means including a motor connected to receive substantially no energy when the booster is inactive.

22. In an electrical system of distribution, a source of electrical current, a feed circuit and its load supplied thereby, a battery and its circuit in operative relation thereto, a booster for controlling the battery action, and means for varying the potential of said source to control the load on the booster responsive to departures from a predetermined electrical condition of the booster, said means including a plurality of motor devices each having its armature connected to be supplied from a source of electro-motive-force which varies responsive to fluctuations of the voltage across the booster, one of said devices having a field coil responsive to booster voltage and the other of said devices having a field coil responsive to booster current.

23. In combination, a circuit to be regulated, a variable resistance for regulating said circuit, a movable member for controlling said resistance, two motor devices for operating said movable member, each device being provided with a regulating field coil and a field coil having a substantially constant exciting effect.

24. In combination, a circuit to be regulated, a variable resistance for regulating said circuit, a movable member for controlling said resistance, two motor devices for operating said movable member, each device being provided with field and armature windings arranged to cause said devices to rotate in either direction, and means for causing the effect of said windings to be different when the rotation is in one direction from the effect of said windings when the rotation is in the opposite direction.

25. In combination, a circuit to be regulated, a variable resistance for regulating the same, a movable member for controlling said resistance, a plurality of dynamometers for operating upon said movable member, a circuit means for producing variable direct currents in both directions in said circuit, means for energizing said dynamometers so that they will operate in both directions responsive to departures from a predetermined electrical condition of said last mentioned circuit and means for causing the effect of said dynamometers to be different when the current in said last mentioned circuit is in one direction from the effect of said dynamometers when the current in said last mentioned circuit is in the opposite direction.

In testimony whereof, I have signed my name to this specification, in the presence of two subscribing witnesses.

ALBERT S. HUBBARD.

Witnesses:
EDWIN SEGER,
GORHAM CROSBY.

Copies of this patent may be obtained for five cents each, by addressing the "Commissioner of Patents, Washington, D. C."